(12) United States Patent
Egami et al.

(10) Patent No.: US 7,880,821 B2
(45) Date of Patent: Feb. 1, 2011

(54) TOUCH PANEL

(75) Inventors: Takehiro Egami, Toyama (JP); Naomi Nakayama, Toyama (JP)

(73) Assignee: SMK Corporation, Tokyo (JP)

( * ) Notice: Subject to any disclaimer, the term of this patent is extended or adjusted under 35 U.S.C. 154(b) by 780 days.

(21) Appl. No.: 11/865,939

(22) Filed: Oct. 2, 2007

(65) Prior Publication Data
US 2008/0131624 A1 Jun. 5, 2008

(30) Foreign Application Priority Data
Dec. 5, 2006 (JP) .............................. 2006-328419

(51) Int. Cl.
G02F 1/137 (2006.01)
C09K 19/00 (2006.01)
G06F 3/041 (2006.01)
(52) U.S. Cl. ................... 349/23; 349/122; 349/139; 349/187; 349/166; 428/1.1; 345/173
(58) Field of Classification Search ............... 349/187, 349/56, 122, 139, 160, 166, 23; 438/30; 345/173, 174, 175, 176, 177, 178; 428/1.1
See application file for complete search history.

(56) References Cited

U.S. PATENT DOCUMENTS

| | | | |
|---|---|---|---|
| 6,937,230 B2* | 8/2005 | Hatakeda et al. | 345/173 |
| 7,190,354 B2* | 3/2007 | Tanaka et al. | 345/173 |
| 7,227,537 B2* | 6/2007 | Nakayama et al. | 345/173 |
| 2004/0156110 A1 | 8/2004 | Ikeyama | |
| 2005/0238846 A1* | 10/2005 | Arakatsu et al. | 428/141 |
| 2008/0131624 A1* | 6/2008 | Egami et al. | 428/1.1 |
| 2009/0147196 A1* | 6/2009 | Horie et al. | 349/122 |

FOREIGN PATENT DOCUMENTS

JP 2004351744 12/2004

* cited by examiner

*Primary Examiner*—Brian M Healy
(74) *Attorney, Agent, or Firm*—Edwards Angell Palmer & Dodge LLP; Peter C. Schechter; Catherine J. Toppin

(57) ABSTRACT

A touch panel for use in an ultra-high resolution display includes a transparent film substrate having one surface made of PET or the like and a transparent electrode film made of ITO film or the like that is formed on the transparent film substrate. A surface of the film substrate opposite the surface on which the transparent electrode is formed has a coating layer including a filler. The filler has an average particle size of 0.1 μm to 0.01 μm, and the coating layer is formed to have a surface having arithmetic particle roughness (Ra) of 0.1 μm to 0.01 μm, whereby the Ra of the surface of the coating layer is formed to $1/2000^{th}$ to $1/4000^{th}$ of the pixel pitch of a display to which the touch panel is attached.

9 Claims, 2 Drawing Sheets

TOUCH PANEL

CROSS-REFERENCE TO RELATED APPLICATION

The present application claims priority under 35 U.S.C. §119 to Japanese Patent Application No. 2006-328419, filed Dec. 5, 2006, and which is hereby incorporated herein by reference in its entirety.

FIELD OF THE INVENTION

The present invention relates to a touch panel used as an input device and provided on the surface of displays and the like of various electronic devices.

BACKGROUND OF THE INVENTION

In recent years, there has been widespread application of electronic devices equipped with touch panels in the display screens thereof. However, extraneous light and reflections cause glare on the surface of these touch panels and affect the visibility of the display. To avoid this, the touch panel film may undergo surface processing known as antiglare processing, whereby the surface of the touch panel is made coarser to scatter light. A method for making the film surface coarser is to coat the film surface with a UV curing resin in which fine particles, known as filler, are dispersed, and then to cure the resin to form a roughness of several microns.

As described for example in Japanese Unexamined Patent Application Publication No. 2004-351744, which is which is incorporated herein by reference in its entirety, a touch panel 2 using this type of touch panel film 1 is configured as shown in FIG. 4. The touch panel 2 is equipped with a touch panel substrate 4, which is a transparent insulative substrate, provided on the front surface of an electronic device liquid crystal display 3. A transparent electrode 7b of ITO (indium-tin oxide) film or the like is provided in a predetermined pattern on the surface of the touch panel substrate 4. Then the touch panel film 1 is attached so as to cover the touch panel substrate 4.

The touch panel film 1 is formed from a film substrate 5 of PET (polyethylene terephthalate) or the like, and on the surface facing the rear surface of the touch panel substrate 4, a transparent electrode 7a of ITO film or the like is provided via an anchor layer 6 at a predetermined spacing of gap g with the transparent electrode 7b of the touch panel substrate 4. Moreover, on the front surface of the film substrate 5 of the touch panel film 1, a filler 8 having a particle size of approximately several microns is affixed with a UV curing resin 9.

However, with the higher resolution of liquid crystal displays in recent years, although the above-described type of antiglare processing with particles of several microns in size is able to suppress reflections and other glare, because light rays from the liquid crystal material have a fine pitch, the filler and roughness thereof cause the light from the liquid crystal to reflect diffusely, creating glare and causing color separation in the liquid crystal pixels, thereby noticeably degrading the visibility of the display.

Thus, Japanese Publication No. 2004-3517441 discloses a touch panel to which antiglare processing is carried out using a filler of fine particles having an average primary particle size of 100 nm or less, forming a ten-point average roughness Rz of at least 100 nm but less than 500 nm.

The prior art disclosed in the Japanese Publication No. 2004-3517441 corresponds to a liquid crystal display having a high resolution known as eXtended Graphics Array (XGA) resolution and a pixel pitch of approximately 123 dpi, but does not provide sufficient effect in suppressing glare and the like for the higher resolution liquid crystal displays of today such as Wide XGA (WXGA) and Super XGA (SXGA) displays having pixel pitches of approximately 0.2/mm.

SUMMARY OF THE INVENTION

The present invention was devised in consideration of the above-described prior art, and it is an object of the present invention to provide a touch panel having a simple configuration wherein no degradation of visibility occurs even when used in a high resolution display.

The present invention is directed to a touch panel comprising a transparent film substrate of PET or the like, and a transparent electrode film of ITO film or the like formed on one surface thereof; wherein an arithmetic particle roughness Ra of 0.1 µm to 0.01 µm is formed on the film substrate surface opposite that on which the transparent electrode is formed, and the Ra is formed to be between $1/2000^{th}$ to $1/4000^{th}$ of the pixel pitch of the display to be attached.

Moreover, the touch panel further comprises a coating layer provided on another surface of the film substrate, and a filler of fine particles distributed and aligned nearly uniformly in a layer within resin in the coating layer; wherein the filler has an average particle size of 0.1 µm to 0.01 µm. The coating layer is formed to have an Ra of 0.1 µm to 0.01 µm, of $1/2000^{th}$ to $1/4000^{th}$ of the pixel pitch of the display to be attached.

The touch panel according to the present invention may be produced using a mold formed to have an Ra of 0.1 µm to 0.01 µm that is pressed against the other surface of the film substrate on the side opposite that on which the transparent electrode is formed, thereby forming an Ra of 0.1 µm to 0.01 µm on the other surface of the film substrate and forming an Ra of $1/2000^{th}$ to $1/4000^{th}$ of the pixel pitch of the display to be attached.

Additionally, an anchor layer may be disposed between one surface of the film substrate and the transparent electrode. A filler of fine particles is distributed and aligned nearly uniformly in a layer within resin in the anchor layer; the filler having an average particle size of 0.1 µm to 0.01 µm, thereby forming an Ra of 0.1 µm to 0.01 µm on the anchor layer, and forming an Ra of $1/2000^{th}$ to $1/4000^{th}$ of the pixel pitch of the display to be attached.

The present invention is capable of providing an inexpensive touch panel having good visibility, without any reflection from extraneous light, and without occurrence of display glare and color separation, even when used in a high resolution display.

BRIEF DESCRIPTION OF THE DRAWINGS

The invention will become more readily apparent from the Detailed Description of the Invention, which proceeds with reference to the drawings, in which.

Figure 1:
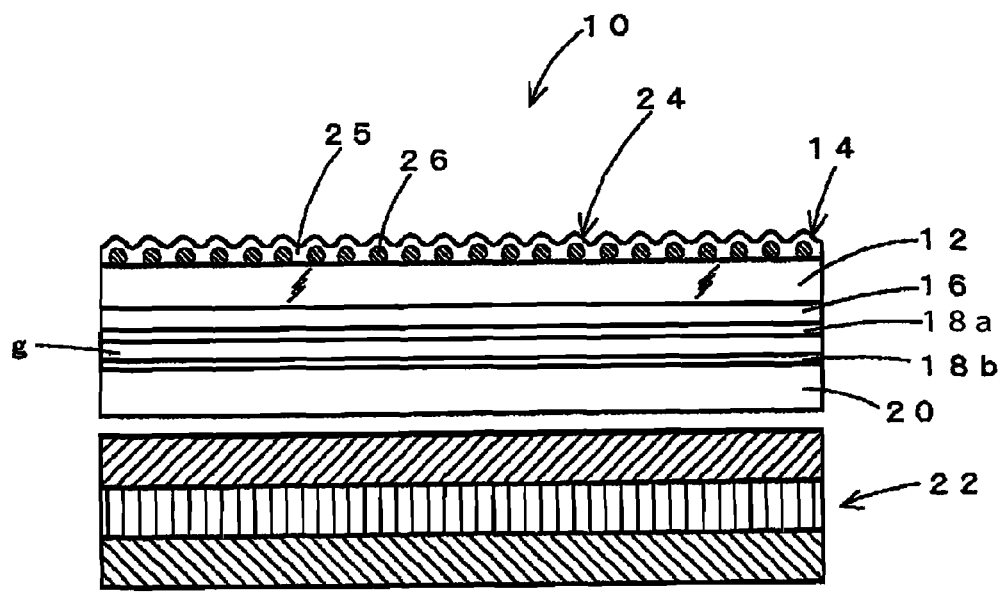
FIG. 1 is a schematic cross section drawing of a touch panel consistent with the principles of the present invention.

In the figures, elements that are repeatedly illustrated are consistently identified by a single reference numeral.

DETAILED DESCRIPTION OF THE INVENTION

The following table provides a key to the reference numerals and elements depicted in the drawings:

| | |
|---|---|
| 10 | Touch panel |
| 12 | Film substrate |
| 14 | Touch panel film |
| 16 | Anchor layer |
| 18a | Transparent electrode film |
| 18b | Transparent electrode film |
| 20 | Touch panel substrate |
| 22 | Housing part |
| 24 | Display |
| 26 | Coating layer |

Embodiments of the present invention are described below with reference to the drawings. FIG. 1 shows a first embodiment of the present invention wherein a touch panel 10 is provided with a touch panel film 14 comprising a film substrate 12 made of PET or the like and having a thickness of approximately 180 to 200 µm, for example. A transparent electrode 18a made of ITO film or the like is formed in a predetermined pattern on the rear surface of the touch panel film 14 with an anchor layer 16 disposed therebetween. The touch panel film 14 is affixed to the film substrate 12, which faces a touch panel substrate 20 on which a transparent electrode 18a and an opposing transparent electrode 18b are formed with a small gap therebetween. Then, the touch panel substrate 20 is affixed to the display surface of a liquid crystal or other display 22 formed from glass or transparent resin.

The film substrate 12 of the touch panel film 14 may be formed, for example, of polyethylene terephthalate (PET), or a transparent polymer such as a polyester polymer, a polycarbonate polymer, diacetyl cellulose, an acrylic polymer and so on. Moreover, a styrene polymer such as polystyrene, polyethylene, an olefin polymer such as polypropylene, a polyvinyl chloride polymer, or an amid polymer typified by nylon or aromatic polyimide and the like having excellent transparency may also be used. Additionally, an imide polymer, a sulfone polymer, a vinyl alcohol polymer, a vinylidene chloride polymer, an arylate polymer, and the like having excellent appropriate transparency may be used according to the application.

The transparent electrode 18 is formed by vacuum-based thin film formation technology such as sputtering, and the anchor layer 16 is coated with a material and formation method similar to that of a curing resin 25 of a coating layer 24, as further described herein below.

On the rear surface of the film substrate 12 of the touch panel film 14 is formed a coating layer 24, and in the coating layer 24 is dispersed a filler 26 of particles that are distributed and aligned substantially uniformly in a layer within the curing resin 25. The filler 26 has an average particle size of 0.1 µm to 0.01 µm, and the arithmetic particle roughness Ra of the coating layer is 0.1 µm to 0.01 µm. Additionally, the Ra of the coating layer 24 is $1/2000^{th}$ to $1/4000^{th}$ of the pixel pitch of the display 22 to which the touch panel is attached.

As examples of the curing resin 25 of the coating layer 24, a UV curing resin is preferable, and monofunctional acrylate or multifunctional acrylate is used.

For the filler 26 in the curing resin 25 of the coating layer 24, a substance comprising a metallic oxide or a metallic fluoride such as $Al_2O_3$, $Bi_2O_3$, $CeO_2$, $In_2O_3$, $In_2O_3.SnO_2$, $MgF_2$, $Sb_2O_5$, $Sb_2O_5.SnO_2$, $SiO_2$, $SnO_2$, $TiO_2$, $Y_2O_3$, ZnO, or $ZrO_2$ may be used. Moreover, two or more substances comprising a metallic oxide or a metallic fluoride may be combined to produce the filler 26.

The coating layer 24 may be formed using, for example, a roll coater, doctor knife, bar coater, gravure roll coater, curtain coater, spin coater or the like. Conventional spray or dipping methods or the like may also be used.

Antiglare processing is performed on the touch panel 10 of this embodiment to form a roughness finer than the corresponding pixel pitch of the display 22, so that even when using an ultra-high resolution display 22 having a pixel pitch of 0.2 mm or smaller, glare from extraneous light and reflections is suppressed, display glare and color separation do not occur, and the visibility is good.

Figure 2:
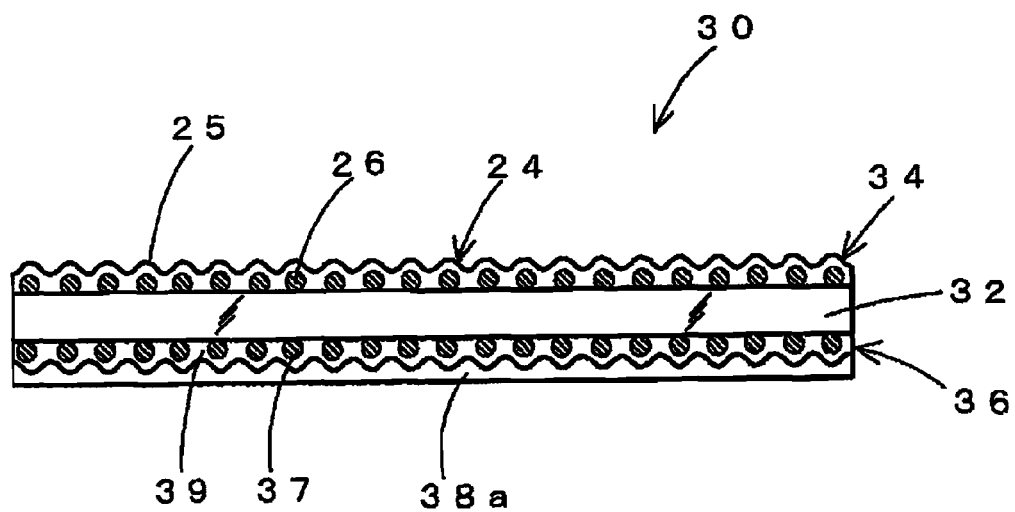
FIG. 2 is a schematic cross section drawing of another touch panel consistent with the principles of the present invention.

Next, a second embodiment of the touch panel of the present invention is explained with reference to FIG. 2. Configurations that are the same as in the above-described first embodiment are assigned the same reference numerals, and their descriptions are omitted herein.

A touch panel 30 is provided with a touch panel film 34 comprising a film substrate 32 made of PET or the like, and having a thickness of approximately 180 to 200 µm, for example. An anchor layer 36 is provided on the touch panel substrate side surface of the film substrate 32, and a transparent electrode 38a is formed in a predetermined pattern on the front surface of the anchor layer 36. A filler 37 of particles are distributed and aligned substantially uniformly in a layer of curing resin 39 of the anchor layer 36. The filler has an average particle size of 0.1 µm to 0.01 µm, and an Ra of the anchor layer 36 is 0.1 µm to 0.01 µm. Additionally, the Ra of the anchor layer 36 is $1/2000^{th}$ to $1/4000^{th}$ of the pixel pitch of the display to which the touch panel is attached. The curing resin 39 of the anchor layer 36 may comprise the same material as the curing resin 25 of the coating layer 24.

Figure 3:
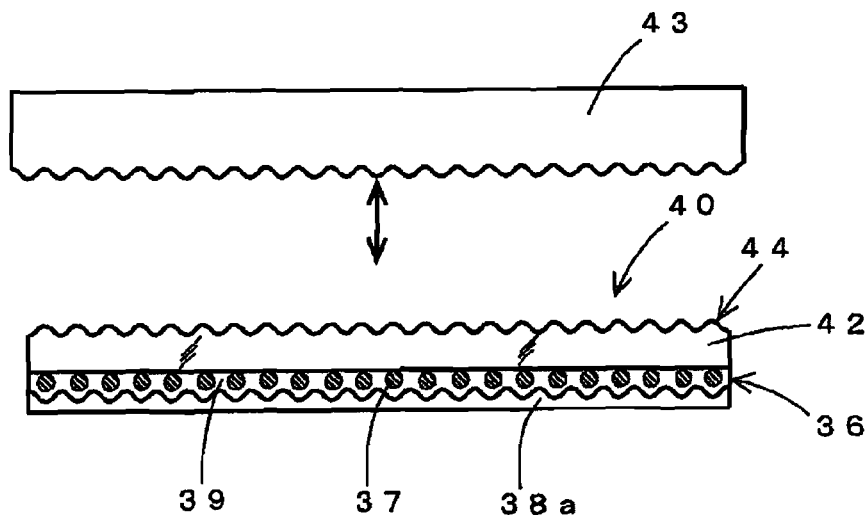
FIG. 3 is a schematic cross section drawing of yet another touch panel consistent with the principles of the present invention.
Figure 4:
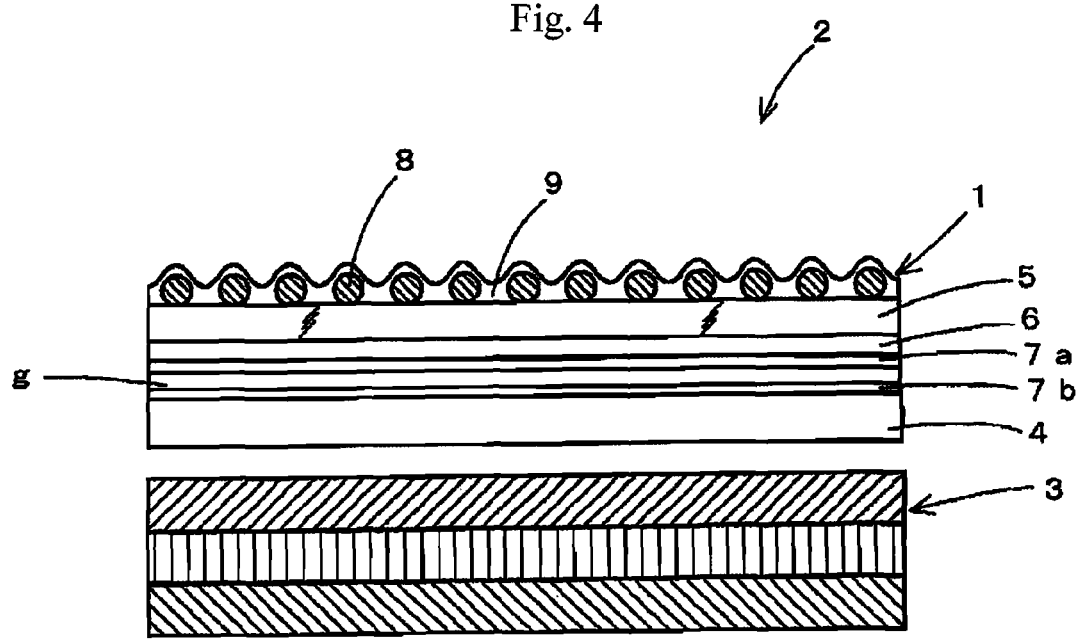
FIG. 4 is a schematic cross section drawing of a typical conventional touch panel.

A third embodiment of the touch panel of the present invention is explained with reference to FIG. 3. Configurations that are the same as in the above-described embodiments are assigned the same reference numerals, and their descriptions are omitted herein. A touch panel 40 is provided with a touch panel film 44 comprising a film substrate 42 made of PET or the like, and having a thickness of approximately 180 to 200 µm, for example. A surface having an Ra of 0.1 µm to 0.01 µm is formed on a side of the touch panel film 44 opposite that on which a transparent electrode 38a similar to that of the above-described second embodiment is formed. The surface of the touch panel film 44 is formed by heating and then pressing thereto a mold 43 of metal or the like having a surface on which is formed a pattern having an Ra of 0.1 µm to 0.01 µm. The surface of the mold 43 may be treated, for example, with a TEFLON treatment or other mold release process.

Similar to the second embodiment, an anchor layer 36 is also provided on the surface of the film substrate 42 on the touch panel side, and a transparent electrode 38a is formed in a predetermined pattern on the surface of the anchor layer 36. A filler 37, similar to that described above, of particles that are distributed and aligned substantially uniformly in a layer is provided within the curing resin 39 of the anchor layer 36, and the Ra of the anchor layer 36 is 0.1 µm to 0.01 µm. The arithmetic particle roughnesses (Ra's) on the front and rear surfaces of the touch panel film 44 are $1/2000^{th}$ to $1/4000^{th}$ of the pixel pitch of the display to which the touch panel is attached.

The touch panel of the present invention is not limited to the above-described embodiments, and a number of methods for forming surface roughness may be selected as appropriate. In addition to the above-described use of a filler or of mold transfer, etching, sandblasting, embossing, and the like may also be used to process the layer surfaces to achieve the desired Ra's. Moreover, the surface coarseness of the anchor layer can be set appropriately according to the pixel pitch of the display being used. In addition to ITO films, indium-zinc oxide (IZO) or other transparent electrode material may be used for the transparent electrode film. The thickness and qualities of the film substrate and other materials may also be set appropriately.

What is claimed is:

1. A touch panel comprising:
a transparent film substrate and a transparent electrode film formed on one surface thereof; wherein
an arithmetic particle roughness (Ra) of 0.1 μm to 0.01 μm is formed on a surface of the film substrate opposite to another surface on which the transparent electrode is formed, and the arithmetic particle roughness (Ra) is formed to $1/2000^{th}$ to $1/4000^{th}$ of the pixel pitch of a display to be attached to the touch panel.

2. A touch panel comprising:
a transparent film substrate;
a transparent electrode film formed on one surface of the transparent film substrate;
a coating layer provided on another surface of the transparent film substrate, and
a filler of fine particles distributed and aligned substantially uniformly in a layer within resin in the coating layer; wherein the filler has an average particle size of 0.1 μm to 0.01 μm, a surface of the coating layer is formed to exhibit an arithmetic particle roughness (Ra) of 0.1 μm to 0.01 μm, and the Ra is formed to $1/2000^{th}$ to $1/4000^{th}$ of the pixel pitch of the display to be attached to the touch panel.

3. A touch panel comprising:
a transparent film substrate and a transparent electrode film formed on one surface of the transparent film substrate; wherein
a mold formed to have an arithmetic particle roughness (Ra) of 0.1 μm to 0.01 μm is pressed against the other surface of the film substrate on the side opposite that on which the transparent electrode is formed, thereby forming the other surface of the film substrate such the it exhibits arithmetic particle roughness (Ra) of 0.1 μm to 0.01 μm, the Ra being selected to be $1/2000^{th}$ to $1/4000^{th}$ of the pixel pitch of a display to be attached to the touch panel.

4. A touch panel film according to claim 1 wherein an anchor layer is disposed between one surface of the film substrate and the transparent electrode, and a filler of fine particles is distributed and aligned substantially uniformly in a layer within resin in the anchor layer; the filler having an average particle size of 0.1 μm to 0.01 μm, thereby forming an arithmetic particle roughness (Ra) of 0.1 μm to 0.01 μm on a surface of the anchor layer, the Ra being formed between $1/2000^{th}$ to $1/4000^{th}$ of the pixel pitch of the display to be attached to the touch panel.

5. A method for forming a touch panel, comprising the steps of:
forming a transparent electrode film on a transparent film substrate; and
forming a surface of the transparent film substrate opposite to another surface on which the transparent electrode is formed, wherein the formed surface has an arithmetic particle roughness (Ra) of 0.1 μm to 0.01 μm, and wherein the Ra is selected to be between $1/2000^{th}$ to $1/4000^{th}$ of the pixel pitch of a display to be attached to the touch panel.

6. A method for forming a touch panel, comprising the steps of:
forming a transparent electrode film formed on one surface of a transparent film substrate;
forming a coating layer provided on another surface of the transparent film substrate, and
a filler of fine particles distributed and aligned substantially uniformly in a layer within resin in the coating layer; wherein the filler has an average particle size of 0.1 μm to 0.01 μm, a surface of the coating layer is formed to exhibit an arithmetic particle roughness (Ra) of 0.1 μm to 0.01 μm, and the Ra is formed to $1/2000^{th}$ to $1/4000^{th}$ of the pixel pitch of the display to be attached to the touch panel.

7. A method for forming a touch panel, comprising the steps of:
forming a transparent electrode film formed on one surface of a transparent film substrate;
forming a mold having an arithmetic particle roughness (Ra) of 0.1 μm to 0.01 μm;
pressing the mold against the other surface of the film substrate on the side opposite that on which the transparent electrode is formed, thereby forming the other surface of the film substrate such the it an Ra of 0.1 μm to 0.01 μm, the Ra being selected to be $1/2000^{th}$ to $1/4000^{th}$ of the pixel pitch of a display to be attached to the touch panel.

8. A touch panel film according to claim 2 wherein an anchor layer is disposed between one surface of the film substrate and the transparent electrode, and a filler of fine particles is distributed and aligned substantially uniformly in a layer within resin in the anchor layer; the filler having an average particle size of 0.1 μm to 0.01 μm, thereby forming an arithmetic particle roughness (Ra) of 0.1 μm to 0.01 μm on a surface of the anchor layer, the Ra being formed between $1/2000^{th}$ to $1/4000^{th}$ of the pixel pitch of the display to be attached to the touch panel.

9. A touch panel film according to claim 3 wherein an anchor layer is disposed between one surface of the film substrate and the transparent electrode, and a filler of fine particles is distributed and aligned substantially uniformly in a layer within resin in the anchor layer; the filler having an average particle size of 0.1 μm to 0.01 μm, thereby forming an arithmetic particle roughness (Ra) of 0.1 μm to 0.01 μm on a surface of the anchor layer, the Ra being formed between $1/2000^{th}$ to $1/4000^{th}$ of the pixel pitch of the display to be attached to the touch panel.

* * * * *